March 25, 1969  W. B. WILKINS  3,434,567
WORK PLATFORM FOR SCAFFOLDS
Filed Dec. 9, 1966
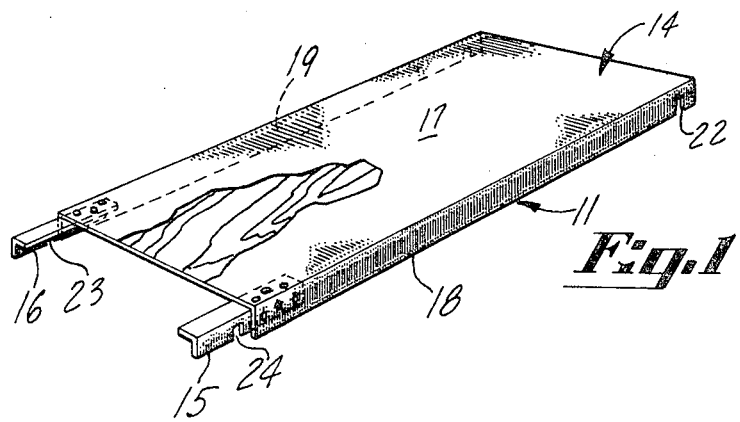
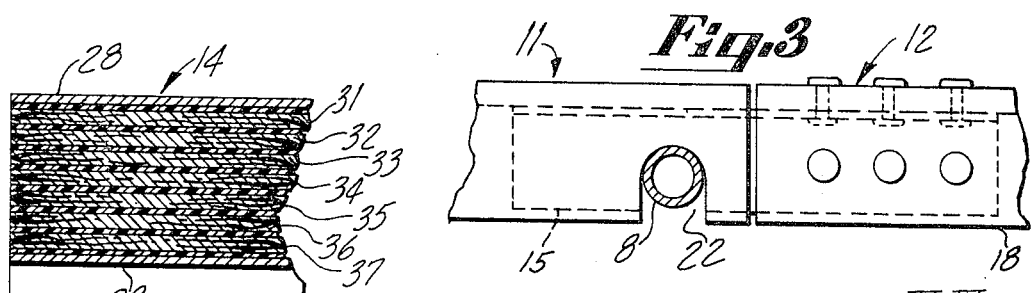
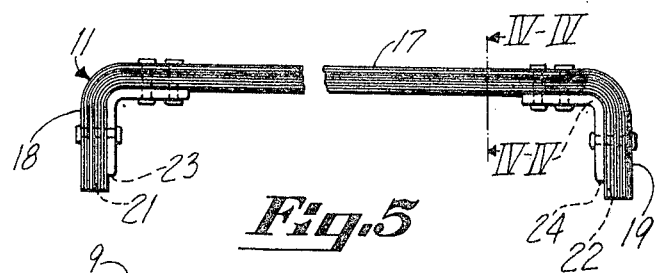
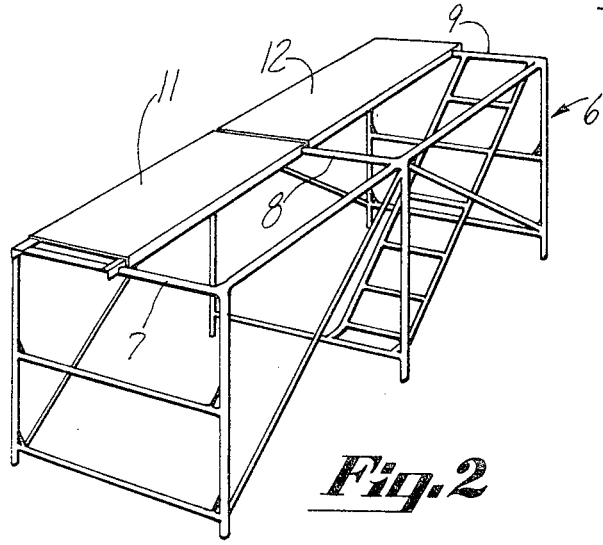
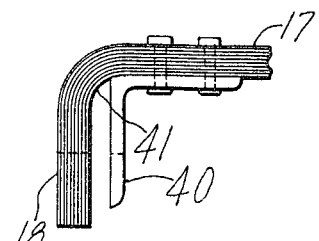
INVENTOR
WILLIAM B. WILKINS
BY
Henry Kozak
ATTORNEY

United States Patent Office 3,434,567
Patented Mar. 25, 1969

3,434,567
WORK PLATFORM FOR SCAFFOLDS
William B. Wilkins, Roxboro, N.C., assignor, by mesne assignments, to Midland-Ross Corporation, Cleveland, Ohio, a corporation of Ohio
Filed Dec. 9, 1966, Ser. No. 600,443
Int. Cl. A64b 7/16; E04g 1/16, 5/08
U.S. Cl. 182—222                                    7 Claims

ABSTRACT OF THE DISCLOSURE

A work platform adapted to attach to horizontally spaced elements of a scaffold and of composite laminated construction providing an outer skin of sheet metal and inner laminae of wood or other low-cost laminating material. The platform is shaped and arranged to correlate its tread surface in contiguous relation with the tread surface of another similar platform in horizontal series relation therewith in the same scaffold.

---

Collapsible work scaffolds usually comprise frames essentially of tubular horizontal and vertical members extending along the peripheries of juxtaposed rectangular space prisms. The work platforms extend across, and are supported by, horizontal members in parallel, horizontally-spaced relationship. In a large scaffold, a plurality of platforms may be laid end-to-end at a single level so that workmen may easily walk from one platform to any other at the same level. The design of such platforms is an important factor in the safety of the workmen using them in regard to such aspects as a lack of continuity in the tread surface of adjacent platforms, or tread surfaces of adjacent platforms which are uneven with respect to each other.

A primary object of this invention is to provide work platforms which may be placed in end-to-end relationship within a scaffold with the ends of the tread surfaces thereof substantially abutting and in excellent registry to effect highly continuous and even end-to-end relationship of such surfaces.

Another object is to provide platforms of the above object of composite construction and at lower cost than now prevalent.

These and other objects apparent hereinbelow are achieved by a work platform of transverse U-shape cross-section comprising plies of wood or other inexpensive non-metal core material, and outer laminae of sheet metal all bonded together into an integral panel with the grain of the wood in the plies extending in a longitudinal direction of the panel, i.e., transversely to its U-shape cross-section.

In a preferred embodiment, angle elements or other registry means extend from one end of the panel to underneath, and in support of, the end portion of the panel of the next serially adjacent work platform to dispose the ends of two panels in registered abutting end-to-end relationship. The extension means at one end of the platform and the flange-like side sections of the panel at the other end of the platform are notched upwardly from lower edges thereof to allow the notched portions to receive the cross members supporting the platforms in a manner placing the panels of a plurality of platforms in substantially continuous and planate relationship.

In the drawings with respect to which the invention is described:

FIG. 1 is a perspective view of a work platform in accordance with this invention;

FIG. 2 is a perspective schematic view of a scaffold including two work platforms, such as shown in FIG. 1;

FIG. 3 is a fragmentary side elevation of end portions of two work platforms, such as shown in FIG. 1, in position on a common supporting member;

FIG. 4 is a fragmentary elevation as taken along a longitudinal vertical cross-section of a center section of a panel of the work platform of FIG. 1;

FIG. 5 is a horizontally shortened end view of the work platform shown wholly or partially in the other figures; and FIG. 6 is a fragmentary end view of a modified work platform.

FIG. 2 schematically illustrates a scaffold having a frame 6 shown without the detail which renders it collapsible in a conventional manner. The frame 6 provides the usually spaced, horizontally-parallel, cross members 7, 8, and 9, occurring substantially along a horizontal plane, which are utilized to support work platforms 11 and 12 of preferably identical construction.

Platform 11, as shown in FIG. 1, comprises a panel 14 and angle shaped elements 15 and 16 fixed thereto by means such as the rivets shown and/or an adhesive. As shown, the panel is elongate and of U-shape cross section in transverse relation to its length. Consequently, the panel has a center tread section 17 and side sections 18 and 19 which are of narrow width as compared to the width of the center section.

To prevent the platform from shifting relative to cross pieces of a scaffold frame on which it is placed, the platform is provided with notches 21 and 22 in the side sections of the panel 14 adjacent one end thereof to receive one of the cross bars, e.g., cross bar 8 of the scaffold frame. The angles 15 and 16 also have notches 23, 24 in the side or vertical webs thereof to receive the next cross bar of the scaffold. The notches of elements 15 and 16 have a spacing relative to the adjacent end of the panel equal to or slightly greater than that of the spacing of notches 21 and 22 relative to the end of the panel nearer thereto.

This relationship allows work platforms to be placed within a scaffold frame with the panels of the platforms in closely abutting end-to-end relationship. In this manner, a substantially continuous tread surface is provided for passage of workmen from one scaffold region to another with safety.

To further promote safety, the upper surfaces of elements 15 and 16 are in the plane of the undersurface of the panel to properly register the upper surfaces of the panels of adjacent platforms in the same plane, as long as the panels thereof are substantially of the same thickness. Preferably, the outer lateral surfaces of the elements 15, 16 achieve good registry of the side panels of adjacent platforms in end-to-end relationship. Since, in practical molding procedures, the panel side sections 18 and 19 join with the panel center section along the inner surfaces and fillets which do not over-stress the plies of wood or other material extended to the corners connecting the sections, the elements 15 and 16 are fabricated from angle stock, preferably rolled with the desired fillet contour along the outer surfaces of the angle stock. The angle elements also may be made from less expensive standard angle metal stock, as shown in FIG. 6.

As FIGS. 4 and 5 illustrate, the panel 14 is of laminated construction wherein the laminae are continuous transversely as well as longitudinally throughout the three sections of the panel. As a preferred construction, the laminae of the panel comprise outer and inner plies 28, 29 of sheet metal, and a core sandwiched between the sheet metal laminae comprising a plurality of sheets of inexpensive fibrous material, such as wood, kraft paper, or woven or non-woven mats of cotton or other vegetable fiber.

In a preferred embodiment, of which the laminae 31 to 37 are exemplary, the laminae consist of plies of wooden veneer with the length of the grain thereof oriented generally parallel with the length of the platform 14. With the grain of the wood thus aligned, the plies may be folded within the corners at which the side sections and the center section connect without damage to fibers oriented lengthwise of the grain of the plies. The use of wooden plies is advantageous in that laminae of greater thickness and less cost than most other sheet materials may be utilized with a minimum use of relatively expensive adhesive resins to achieve low labor cost and an overall minimum cost for the panel.

When the panel core is formed of wood veneer, the grain of the wood is used in a manner which maximizes its contribution to the beam strength of the panel and permits the economic use of high-strength adhesive resins, such as epoxies, to further contribute to the beam strength of the panel. Such construction of the core as just described achieves maximum utilization of the tensile and compressive strengths of sheet metal, such as steel, in the inner and outer skins of the panel. Such features of construction as just discussed are reflected in the beam strength as a result of the top loading of the platform in respect to any one of the sections of the panel considered separately, or all three sections considered in combination.

Epoxy resins may be used as the adhesive which joins the various laminae of the work platform herein described because such resins minimize the problem of joining of wood and metal. The type of resin selected, whether solid or liquid, and the rate of cure will depend upon the rapidity and mode of manufacture adopted, e.g., whether the assembled panels are to be room temperature cured or cured in ovens. For example, one manufacturer has used an epoxy resin of the high viscosity liquid type mixed with sufficient amount of a liquid amine as a hardener to enable curing of assembled panels clamped in a state of assembly within a press for about 5 minutes when heated by the press at temperatures to about 250° F. At the end of the 5-minute period, the panel was removed from the press and maintained its permanent configuration.

Because of the difficulty of pre-cutting the laminae and assembling them to achieve a desired trim and dimensions of the finished panel, the panel pieces are preliminarily cut to a slight oversize. The panel is then trimmed to its intended configuration after the curing treatment.

In general, epoxy resins are not completely cured during a heat and pressure treatment but continue to an ultimate cure under room conditions for several days. This is no disadvantage since sales distribution after manufacturing involves periods of time which greatly exceed the time required for complete curing.

The scaffold platform structure disclosed herein may be achieved by core materials other than the preferred combination described above. The core, i.e., the part of the panel sandwiched between the outer metal laminae is advantageously formed of any inexpensive flexible sheet material comprising natural or synthetic fiber. Except for an unusual market situation, fiber reinforcement of the core will be achieved at lowest cost in the use of natural fibers of wood, straw, hemp, etc. Laminae in the form of sheets of such fibers simplify manufacturing of the panels because the fibers in sheet form are highly compact and may be easily coated. Thus, desired ultimate thicknesses of the panel are obtained without complicated equipment.

Since platforms according to this invention are constructed for use in scaffold frames currently used by the trade, a typical platform, as disclosed herein, has a notch-to-notch length measured lengthwise of the platform which conforms to the spacing of cross bars as provided by any of the various manufactures of scaffold frames. Scaffold frames now commercially available provide, in general, center-to-center spacings of cross bars at six to seven feet. In one instance, for example, platforms were built with a notch-to-notch length of seven feet, an overall length of 7 feet, 6 inches, an overall width of 22 inches, overall depth of 3 inches, a panel thickness of ½ inch, notches in the angle element and the panel spaced 2 inches from the nearer end of the panel, and angle elements 18 inches long made from 2 inches x 2 inches x ⅛ inch standard angle stock. The angles (see angle 40 in FIG. 6) were attached to the flat undersurface of the center section 17 in spaced relation with the side sections 18 and 19 and in the clear of adjacent fillet areas as at 41. The thickness of the panel included 7 plies of birch veneer cut to 1/16 inch thickness and outer plies of 0.012 page sheet steel. The liquid epoxy resin used as the adhesive was mixed with 10 percent by weight of clay for better retention of the adhesive at the wooden interfaces.

In addition to the epoxy resins, the unsaturated polyester resins are thermosetting without evolution of objectionable quantities of gas. Certain polyester resins are desirable as wood-to-metal adhesives and may be used to bond the outer sheet metal skins of the panel to the inner laminae of wood or other fibrous sheeting. The use of perforated metal sheeting or screen as the outer laminae in combination with porous or self-ventilating types of non-metallic fibrous sheet materials for forming the laminae of the core make it possible to employ a wider selection of adhesives including the so-called phenolic or urea-type resins, and those thermosetting adhesives based on a composition containing a solvent and a natural or synthetic rubber.

The panel 14 may be manufactured also in a manner utilizing less expensive thermosetting and thermoplastic resins, such as compositions containing phenolformaldehyde, urea-formaldehyde, and other resin-forming materials which may be condensed or polymerized to an intermediately hardened, non-tacky stage. For example, compositions containing thermosetting resins may be applied to sheet metal as a solution and cured to an intermediate solid non-tacky state, or a thermo-plastic composition having adequate adhesion for metal may be deposited on the sheet metal in the form of a non-tacky coating, to render the sheet materials suitable for storage, or for entering the channels of commerce without causing difficult packaging problems. Coating the sheet metal as herein contemplated includes solution, powder, or emulsion application, spraying liquids or powders with or without electrostatic means, dipping, fluidized bed coating, or other techniques.

According to this general method, sheet steel or other sheet metal is thoroughly cleaned by wet chemical treatment and, in a matter of seconds before the clean metal surface has any opportunity to deteriorate, a liquid solution, emulsion, or dust of the desired resin is applied to the clean metal. The coated sheet metal which may be preheated is subjected to a heating treatment which, in the case of the thermosetting resin, cures the applied composition to a partially cured, non-tacky, solid, continuous coating on the sheet. In any case, the heating treatment serves to fix the resin to the sheet. Applied in this manner, phenol-formaldehyde or urea-formaldehyde compositions, or various other materials which have heretofore been difficult to bond to metal, have excellent adhesion to the metal.

The sheet metal in appropriate lengths is then assembled with plies of wood which have been treated, e.g., with the same resin as the sheet metal initially received. The wooden plies may also have been treated with another resin compatible with the resin applied to the metal. The assembled uncured panel is then subjected to heat and pressure to effect curing or fusion at all interfacial surfaces of the laminae. In the case of the thermosetting resin, curing is carried to a stage beyond that of the partially cured coating on the metal sheet as disclosed above.

The latter heating and pressure step is performed in a manner well-known to the art of plywood manufacture to obtain a completely bonded panel. For example, the assembly may be subjected to a heating and pressure stroke effected between suitably shaped platens, then instantaneously released to allow the escape of vapor, and then again subjected to heating and pressure by the platens to effect further bonding of the panel laminae.

The terms and expressions which have been employed are used as terms of description and not of limitation and there is no intention of excluding such equivalents as fall within the scope of the claims.

What is claimed is:

1. A work platform for spanning spaced transverse support bars of a scaffold comprising:
   a panel having a pair of side sections connected by a center section in a U-shape conformation extending transversely of the length of the panel;
   the panel comprising a plurality of wooden plies oriented with the grain thereof extending in the lengthwise direction of the panel, outer and inner laminae of sheet metal covering the outer plies of said plurality, and adhesive material uniting all of said plies and laminae into an integrated one-piece body.

2. The work platform of claim 1 comprising:
   registry means anchored to and projecting from one end of the panel with outer surfaces thereof in lengthwise projection of the undersurface of said center section for supporting a second similar panel in end-to-end juxtaposed relationship with said panel.

3. The work platform of claim 1 comprising:
   registry means anchored to and projecting from one end of the panel with outer surfaces thereof in lengthwise projecting relation with the inner surfaces of said three sections for supporting a second similar panel in matching end-to-end juxtaposed relationship with said panel.

4. The work platform of claim 3 wherein:
   said registry means and the side sections of the second panel, when in said relationship, all have notches extending upwardly from lower edges thereof in transverse registry for receiving one of said support bars.

5. The work platform of claim 1 comprising:
   registry elements fixed to said panel and projecting outwardly from one end thereof, a projecting portion of each element having outer surfaces lying in lengthwise projection of the inner surfaces of one of said side sections and the center section;
   said side sections having downward opening notches in transverse and equally spaced adjacent relation with the end of panel remote from said element for receiving one of said supports; and
   said elements having downward opening notches spaced from the adjacent end of the panel a distance equal to spacing of said side section notches from said remote end for receiving another of said support base.

6. The work platform of claim 1 wherein:
   said adhesive material comprises a single thermosetting composition substantially adherent to wood and metal, said composition being curable in situ between said laminae and said plies without evolution of gaseous and liquid reaction products.

7. The work platform of claim 1 wherein:
   said adhesive material comprises a single thermosetting composition strongly adherent to both metal and natural fibrous material, said composition in a solid state, and being of a type capable of passing from a fluid to a solid state by internal chemical reaction without the production of gaseous or liquid reaction products.

References Cited

UNITED STATES PATENTS

| 2,100,002 | 11/1937 | Evans et al. | 182—222 |
| 2,225,737 | 12/1940 | De Vaney | 182—222 |
| 2,274,703 | 3/1942 | John | 182—222 |
| 2,649,304 | 8/1953 | Ulanovsky | 182—222 |
| 2,808,296 | 10/1957 | Stinson | 182—222 |

REINALDO P. MACHADO, *Primary Examiner.*

UNITED STATES PATENT OFFICE

CERTIFICATE OF CORRECTION

Patent No. 3,434,567

March 25, 1969

William B. Wilkins

It is certified that error appears in the above identified patent and that said Letters Patent are hereby corrected as shown below:

Column 6, line 17, "base" should read -- bars --.

Signed and sealed this 31st day of March 1970.

(SEAL)
Attest:

Edward M. Fletcher, Jr.
Attesting Officer

WILLIAM E. SCHUYLER,
Commissioner of Patei